United States Patent
Boudreau et al.

(10) Patent No.: US 10,602,214 B2
(45) Date of Patent: Mar. 24, 2020

(54) COGNITIVE TELEVISION REMOTE CONTROL

(71) Applicant: INTERNATIONAL BUSINESS MACHINES CORPORATION, Armonk, NY (US)

(72) Inventors: Michael K. Boudreau, Orange, CA (US); Jia Chen, Ossining, NY (US); Sarbajit K. Rakshit, Kolkata (IN); Craig M. Trim, Sylmar, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/409,827

(22) Filed: Jan. 19, 2017

(65) Prior Publication Data

US 2018/0205985 A1    Jul. 19, 2018

(51) Int. Cl.
| | |
|---|---|
| *H04H 60/33* | (2008.01) |
| *H04N 21/422* | (2011.01) |
| *H04N 21/442* | (2011.01) |
| *H04N 21/488* | (2011.01) |
| *H04N 21/439* | (2011.01) |
| *H04N 5/44* | (2011.01) |

(52) U.S. Cl.
CPC ..... *H04N 21/42204* (2013.01); *H04N 5/4403* (2013.01); *H04N 21/4396* (2013.01); *H04N 21/44218* (2013.01); *H04N 21/4882* (2013.01); *H04N 2005/4444* (2013.01)

(58) Field of Classification Search
CPC ......... H04N 21/42204; H04N 21/4396; H04N 21/44218; H04N 21/4882; H04N 5/4403; H04N 2005/4444
See application file for complete search history.

(56) References Cited

U.S. PATENT DOCUMENTS

| | | |
|---|---|---|
| 4,528,989 A | 7/1985 | Weinblatt |
| 7,379,560 B2 | 5/2008 | Bradski et al. |

(Continued)

OTHER PUBLICATIONS

Zhang et al., "Domain knowledge, search behaviour, and search effectiveness of engineering and science students: an exploratory study", IR Information Research, vol. 10 (2), Jan. 2005, http://www.informationr.net/ir/10-2/paper217.html, 20 pages.

(Continued)

*Primary Examiner* — Mulugeta Mengesha
(74) *Attorney, Agent, or Firm* — James Nock; Andrew D. Wright; Roberts Mlotkowski Safran Cole & Calderon P.C.

(57) ABSTRACT

Systems and methods for a cognitive display control are disclosed. A method includes: obtaining, by a computer device, context information of current content being displayed on a display; generating, by the computer device, a respective attention score for each one of plural users for the current content; receiving, by the computer device, input to change from the current content to new content; determining, by the computer device and based on the receiving, that the attention score of at least one of the plural users exceeds a threshold value; and controlling the display, by the computer device and based on the determining, to display an alert and a prompt to confirm or reject changing to the new content.

20 Claims, 5 Drawing Sheets

(56) References Cited

U.S. PATENT DOCUMENTS

| | | |
|---|---|---|
| 8,661,508 B2 | 2/2014 | Evans et al. |
| 8,739,196 B2* | 5/2014 | Yao .......................... H04N 5/50 725/14 |
| 2007/0066916 A1 | 3/2007 | Lemos |
| 2007/0265507 A1 | 11/2007 | de Lemos |
| 2010/0211439 A1 | 8/2010 | Marci et al. |
| 2011/0320482 A1 | 12/2011 | Barbieri et al. |
| 2013/0125155 A1 | 5/2013 | Bhagavathy et al. |
| 2014/0098116 A1 | 4/2014 | Baldwin |
| 2014/0168277 A1* | 6/2014 | Ashley .................. G06F 3/1446 345/672 |
| 2014/0181910 A1* | 6/2014 | Fingal ................... H04L 63/105 726/4 |
| 2014/0210702 A1 | 7/2014 | Peterson et al. |
| 2015/0146879 A1* | 5/2015 | Nguyen ............... H04R 1/1041 381/74 |
| 2016/0275833 A1* | 9/2016 | Forbes ............... G06K 9/00335 |
| 2016/0323643 A1* | 11/2016 | Panchaksharaiah ........................ H04N 21/44016 |
| 2017/0094215 A1* | 3/2017 | Western ............... H04N 5/4403 |

OTHER PUBLICATIONS

Cole et al., "Inferring User Knowledge Level From Eye Movement Patterns", Processing and Management, vol. 49 (5), Sep. 1, 2013, http://digitalcommons.wayne.edu/cgi/viewcontent.cgi?article=1096 &context=slisfrp, 22 pages.

"List of IBM Patents or Patent Applications Treated as Related", dated Dec. 13, 2019, 1 page.

Specification "Cognitive Display Control" and drawings in related U.S. Appl. No. 16/681,274, filed Nov. 12, 2019, 40 pages.

* cited by examiner

COGNITIVE TELEVISION REMOTE CONTROL

BACKGROUND

The present invention generally relates to controlling content displayed on a display device, and, more particularly, to a system and method for a cognitive display control.

SUMMARY

In a first aspect of the invention, there is a method that includes: obtaining, by a computer device, context information of current content being displayed on a display; generating, by the computer device, a respective attention score for each one of plural users for the current content; receiving, by the computer device, input to change from the current content to new content; determining, by the computer device and based on the receiving, that the attention score of at least one of the plural users exceeds a threshold value; and controlling the display, by the computer device and based on the determining, to display an alert and a prompt to confirm or reject changing to the new content.

In another aspect of the invention, there is a computer program product that includes a computer readable storage medium having program instructions embodied therewith. The program instructions are executable by a computing device to cause the computing device to: obtain context information of current content being displayed on a display; generate a respective attention score for each one of plural users for the current content; receive input to change from the current content to new content; compare, based on the receiving, the attention score of each one of plural users to a threshold value; and control the display, based on the comparing, to perform one of: display the new content when the attention score of none of the plural users exceeds the threshold value; and continue displaying the current content and display an alert and a prompt when the attention score of at least one of the plural users exceeds the threshold value.

In another aspect of the invention, there is a system that includes: a CPU, a computer readable memory, and a computer readable storage medium associated with a computer device; program instructions to obtain context information of current content being displayed on a display; program instructions to generate an attention score for a user for the current content; program instructions to determine the current content matches a predefined type; program instructions to determine the attention score exceeds a threshold value; and program instructions to control the display to discontinue showing the current content based on determining that the current content matches a predefined type and the attention score exceeds a threshold value. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
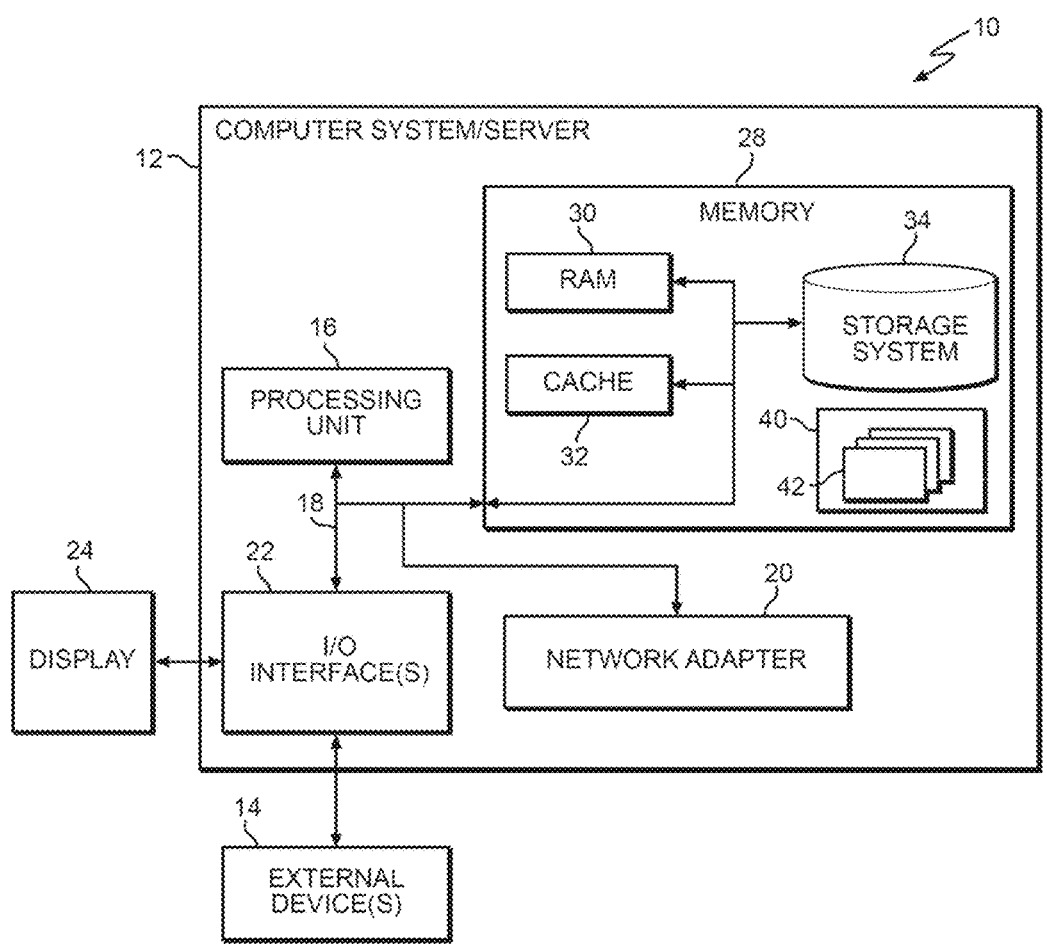
FIG. 1 depicts a computing infrastructure according to an embodiment of the present invention.

The present invention generally relates to controlling content displayed on a television and, more particularly, to a system and method for a cognitive television remote control. People often watch television together as a group. During group viewing, it is common for different ones of the people to have different levels of attention toward the content that is currently displayed by the television. For example, some of the people may be very attentive to the current content, other ones of the people may be mildly attentive, and some of the people may have little or no attention toward the current content. In such a group viewing situation, it is common place for a person who is highly attentive to the current content to become frustrated when another person changes the content, e.g., changes the channel, in an unannounced manner. For example, the television may be currently displaying a soccer match to which a first person is highly attentive. When a second person suddenly and without announcement changes the content displayed by the television, e.g., to a situation comedy, the first person may become frustrated in the sudden change of content.

According to aspects of the invention, there is a system and method by which a home network system analyzes an attention level and determines an attention score of each viewer of a television program being displayed. The attention score of each viewer may be based on at least one of: the viewer's interest in a topic of the television program as determined from social media; the viewer's knowledge level on the topic of the television program as determined from social media; the viewer's historical content viewing pattern; and the viewer's facial pattern and interactiveness with the television program. Based on receiving user input to change the currently displayed content, e.g., an input to change the channel via a remote control, the system causes the television to display an alert when a viewer has an attention score that exceeds a threshold. In this manner, the viewers can discuss the proposed content change prior to the content actually changing on the television. The alert may include a prompt for user input to confirm or reject the proposed content change. Upon receiving confirmation of the content change, the system may display the new content, i.e., the new channel, on the television and may display the previous content in a picture-in-picture display or on a mobile device of the viewer whose attention score exceeds the threshold.

Aspects of the invention may also be used to implement a parental control system for a child. In embodiments, the system may determine an attention score of a child to content being displayed on the television. When the attention score of the child exceeds a threshold value that is based on a maturity level of the content, the system may automatically change the displayed content.

Implementations of the invention described herein may be used to provide a method that includes: identifying a group of individuals viewing media content displayed through a television device; capturing an attention level of the group of individuals toward the media content, the attention level being determined from facial patterns of the group of individuals and web activity of the group of individuals concurrent with the viewing; determining that the attention level of at least one of the individuals exceeds a predetermined threshold; and, responsive to receiving an instruction to cause a television device to display a different media content, delaying execution of the instruction and alerting the group of individuals that the television device is to display the different media content.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
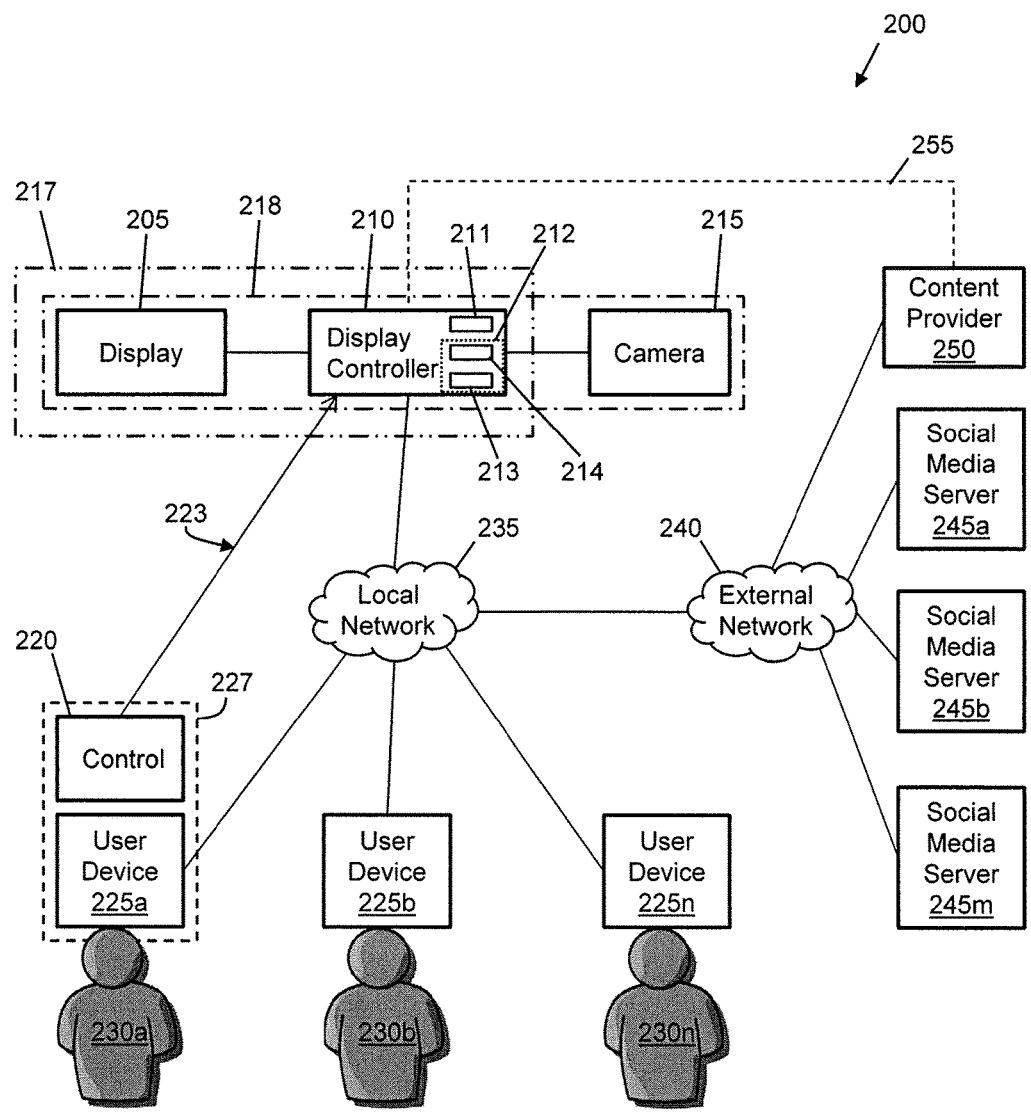
FIG. 2 shows a block diagram of an exemplary system in accordance with aspects of the invention.

FIG. 2 shows a block diagram of an exemplary system 200 in accordance with aspects of the invention. The system 200 includes a display 205, a display controller 210, and a camera 215. The display 205 may be a television or similar video display device. The display controller 210 is a computer device that controls the content that is displayed on the display 205. In one embodiment, the display 205 and the display controller 210 are separate components, e.g., the display controller 210 is a set-top box. In another embodiment, the display 205 and the display controller 210 are integrated as a single component, e.g., a smart television, as indicated by box 217. In either embodiment, the display controller 210 may include one or more components of the computer system 12 of FIG. 1. For example, in embodiments the display controller 210 includes a processor 211 (which may be processing unit 16), memory 212 (which may be memory 28), a user profile module 213 (which may be one or more program modules 42), and an attentiveness module 214 (which may be one or more program modules 42). The user profile module 213 and the attentiveness module 214 may be programmed to perform one or more functions described herein.

The camera 215 may be any suitable camera device that captures video image data of an area adjacent the display 205. The camera 215 may be separate from the display controller 210, may be mounted in any suitable location, and may communicate with the display controller 210 by wired or wireless communication. In an alternative embodiment, the camera 215 is integrated with the display controller 210, or integrated with both the display 205 and the display controller 210 as indicated at box 218.

Still referring to FIG. 2, the system 200 includes a remote control 220 that is configured to communicate with the display controller 210 for the purpose of controlling (e.g., changing) content that is displayed on the display 205. In an embodiment, the remote control 220 comprises a conventional remote control that transmits a signal 223, e.g., an infrared light signal, to the display controller 210. In another embodiment, the remote control 220 is integrated with a user device 225a, such as a smartphone, tablet computer, or laptop computer, as indicated by box 227, and may be configured to transmit control signals to the display controller 210 via a local network 235. In either embodiment, the remote control 220 may be configured to provide control signals for the purpose of controlling conventional display functions including but not limited to: power, volume, tuning (e.g., channel selection), input source, menu, cursor movement, ok, back, and exit.

As depicted in FIG. 2, any number "n" of user devices 225a-n may be connected to the local network 235. Each user device 225a-n may be associated with a respective human user 230a-n. Each user device 225a-n may comprise a mobile computing device such as a smartphone, tablet computer, or laptop computer. The local network 235 may comprise a local area network (LAN) such as a home network, which can also be referred to as a home area network (HAN).

With continued reference to FIG. 2, the local network 235 is connected to an external network 240 such as the Internet. Different social media providers may host any number "m" of social media servers 245a-m on the external network 240. In this manner, the user devices 225a-n may access the social media servers 245a-m via the local network 235 and the external network 240. Additionally or alternatively, the user devices 225a-n may access the social media servers 245a-m via the external network 240, e.g., via cellular connection, without using the local network 235. In either event, respective ones of the user devices 225a-n may access respective ones of the social media servers 245a-m for performing conventional social media functions, including but not limited to: posting social media content to their own social media account; viewing social media content of other social media users; and providing feedback to social media content of other social media users, such as like, dislike, share, +1, etc.

The content displayed on the display 205 may comprise, for example, a television show, movie, infomercial, etc., and may be obtained by the display controller 210 from a content provider 250 such as a cable provider, streaming content provider, internet service provider, etc. The content provider 250 may be connected to the display controller 210 via the external network 240 or another network such as a private or semi-private network indicated by line 255.

According to aspects of the invention, the attentiveness module 214 is configured to determine an attention score for each user 230a-n viewing content displayed on the display 205. In embodiments, the attentiveness module 214 determines an attention score for a user based on at least one of: data from the camera 215, and data from one or more of the user devices 225a-n and social media servers 245a-n (e.g., web activity of the group of individuals) concurrent with the viewing the content on the display 205. The attentiveness module may use this data to determine an attention score of each user based on at least one of: the user's interest in a topic of the content as determined from social media; the user's knowledge level on the topic of the content as determined from social media; the user's historical content viewing pattern; and the user's facial pattern and interactiveness with the content.

Data from the camera 215 may be used by the attentiveness module 214 to determine whether a respective user is looking at the display 205. For example, the location of the display 205 and the location of the camera 215 may be defined in the attentiveness module 214 (e.g., by user input or automatic determination techniques), and the attentiveness module 214 can be programmed with appropriate image processing techniques to use the image data from the camera 215 to determine an eye gaze direction of each user. In this manner, the attentiveness module 214 may determine whether each respective user is looking at the display 205 at any given time, and for how long each user has been looking at the display 205. The amount of time that a user has been looking at the display 205 can be used as a factor in the attention score, with longer times spent looking at the display 205 by a user being given more weight than shorter times (including not looking at all).

Additionally or alternatively, data from the camera 215 may be used by the attentiveness module 214 to determine a respective user's behavior with respect to the content being displayed on the display 205. For example, the attentiveness module 214 can be programmed with appropriate image processing techniques to use the image data from the camera 215 to determine one or more of: the user's facial expressions; whether the user is performing other tasks concurrently while watching the display 205; and whether the user has asked other users to keep quiet. Specifically, the attentiveness module 214 may utilize image processing techniques such as facial recognition techniques and image analysis techniques (e.g., pixel-based analysis, object detection, etc.) to determine a user's facial expressions, whether a user is performing other tasks concurrently while watching the display 205, and whether a user has asked other users to keep quiet. The facial recognition techniques may be used to determine which users are currently in the vicinity of the display 205, for the purpose of determining the users for which to determine an attention score.

Facial expression of a user 230a-n can be used as a factor in the attention score of the user, with certain facial expressions (e.g., satisfaction, laughing, sadness, etc.) being given more weight than other facial expressions (e.g., boredom, sleepiness, etc.). A determination that a user 230a-n is performing other tasks can be used as a factor in the attention score of the user, with a higher score being assigned to users who are not performing other tasks and a lower score being assigned to users who are performing other tasks concurrently while watching the display 205. A determination that a user (e.g., user 230a) has asked other users (e.g., user 230b) to keep quiet can be used as a factor in the attention score of the user, with a higher score being assigned to users who have asked others to keep quiet and a lower score being assigned to users who have asked others to keep quiet while watching the display 205. Different facial expressions, whether the user is performing other tasks, and whether the user has asked other users to keep quiet may each be assigned respective weights in the determination of the attention score, e.g., as user defined settings in the attentiveness module 214.

According to aspects of the invention, the attentiveness module 214 determines at least one of the interest, knowledge, and likes of a user for the currently displayed content, and uses this information in determining the attention score for the user. The interest, knowledge, and likes of a user for the displayed content may be determined based on comparing context information of the content to social media content of the user.

The context information of the content being displayed on the display 205 may be determined by the attentiveness module 214 based on metadata associated with the content. For example, content provided by the content provider 250 may include metadata such as one or more of: title, topic(s), genre(s), rating, description, tags, unique ID numbers, actor(s), director, year released, and studio name. The attentiveness module 214 may extract this metadata from content data provided by the content provider 250. Additionally or alternatively, the context information of the content being displayed on the display 205 may be determined by the attentiveness module 214 based on analyzing video and/or audio of the content. For example, the attentiveness module may use contextual video analysis and/or contextual audio analysis techniques to detect one or more of topic(s), genre(s), and actor(s) contained in the content. In embodiments, the attentiveness module 214 determines the context information of the content concurrently with the content being displayed on the display 205.

The social media content of a user (e.g., user 230*a*) may be determined by the attentiveness module 214 based on data from the user device 225*a* and/or data from at least one of the social media servers 245*a*-*m*. The social media content of the user may include, for example, the user's posts of social media content to their own social media account(s); the user's viewing of social media content of other social media users; and the user's feedback to social media content of other social media users, such as like, dislike, share, +1, etc. To protect user privacy, the attentiveness module 214 may be programmed to only analyze a user's public social media data. Additionally, the attentiveness module 214 may be configured to permit a user to voluntarily opt-in to permit the attentiveness module 214 to access their non-public social media data for the purpose of determining their attention score.

According to aspects of the invention, the attentiveness module 214 is configured to compare the obtained social media content of the user to the context information of the content being displayed on the display 205, and to use this comparison in determining the attention score of the user for the content. For example, the user's social media content may contain one or more posts that positively or negatively reference a topic of the content. The attentiveness module 214 may analyze the number of such posts and the positive or negative sentiment of such posts to determine the user's interest level in the content. A greater number of posts with positive sentiment may indicate a relatively higher level of interest than a lesser number of posts with the same sentiment or the same number of posts with a negative sentiment. In another example, the user's social media content may include feedback to other users social media posts, and the attentiveness module 214 may analyze the amount (e.g., number) of such feedback and the positive or negative sentiment of such feedback (e.g., shares, likes, dislikes, etc.) in determining the user's interest level in the content. As with posts, the amount of feedback and the sentiment of the feedback can be used in determining relative levels of interest in the content. The user's determined level of interest in the content being displayed on the display 205 can be used as a factor in the attention score of the user, with higher levels of interest being given more weight than lower levels of interest. Embodiments are not limited to these two examples of the manner in which the attentiveness module 214 may compare determine the user's interest level in the content, and implementations of the invention may use any suitable technique for deriving a user's interest level in the content based on comparing the user's social media content to the context information of the content.

In embodiments, the attentiveness module 214 may be configured to determine a user's knowledge level in the content based on comparing the user's social media content to the context information of the content. For example, the attentiveness module 214 may be programmed to determine, from the user's social media content, how long a time period a user has been following a topic of the content being displayed on the display 205. As another example, the attentiveness module 214 may be programmed to determine, from the user's social media content, how much information a user has viewed (e.g., read) about a topic of the content being displayed on the display 205. A longer time following a topic may result in a higher knowledge level than a lower time following the topic. Similarly, a greater amount of information viewed about a topic may result in a higher knowledge level than a lesser amount of information viewed about a topic. The user's determined level of knowledge in the content being displayed on the display 205 can be used as a factor in the attention score of the user, with higher levels of knowledge being given more weight than lower levels of knowledge.

In embodiments, the attentiveness module 214 may be configured to determine a user's historical viewing pattern of content displayed on the display 205. For example, the attentiveness module 214 may store a profile for each user in the profile module 213, and the profile may include a history of different content (e.g., television shows) watched by the user. Based on this data, for content being displayed on the display 205, the attentiveness module 214 may determine that the user has a relatively high historical viewing pattern (e.g., the user has watched this series in the past) or that the user has a relatively low historical viewing pattern (e.g., the user has not watched this series in the past). The user's determined historical viewing pattern of the content being displayed on the display 205 can be used as a factor in the attention score of the user, with higher levels of historical viewing being given more weight than lower levels of historical viewing.

Still referring to FIG. 2, in embodiments the attentiveness module 214 determines a respective attention score for each user 230*a*-*n* concurrently with the content being displayed on the display 205. The attentiveness module 214 may be programmed to update each user's attention score at any desired interval, for example once per second. A user's attention score may change based on new data from the camera 215 or new data from the user's social media. For example, the attentiveness module 214 may update a user's attention score based on the user changing the direction of their gaze relative to the display 205 while the content is being displayed, starting or stopping interacting with their user device while the content is being displayed, generating new social media content about the content being displayed (i.e., posting about the content on their user device while watching the content on the display 205), etc. In embodiments, the attentiveness module 214 stores the current attention score for each user in the user's profile in the profile module 213.

According to aspects of the invention, when the display controller 210 receives an input from the remote control 220 to change the content displayed on the display (e.g., to change from the current content to a new content), the attentiveness module 214 determines whether the attention score for any user 230*a-n* exceeds a threshold value. In embodiments, the attentiveness module 214 obtains the attention score for each user from the profile module 213 and compares each attention score to the threshold value, which may be any suitable default value or user-defined value. When none of the attention scores exceed the threshold value, the attentiveness module 214 permits the display controller 210 to change the content in the manner indicated by the command from the remote control 220.

Figure 3A:
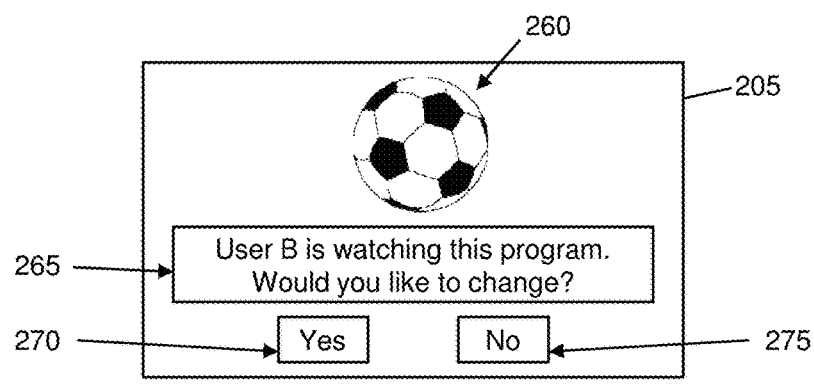
FIGS. 3A, 3B, and 3C show an exemplary use case in accordance with aspects of the invention.

When one or more of the attention scores exceeds the threshold value, the attentiveness module 214 temporarily prevents the display controller 210 from changing the content in the manner indicated by the command from the remote control 220 and causes an alert to be displayed on the display 205. An exemplary alert 265 is depicted in FIG. 3A. In embodiments, the display controller 210 displays the alert 265 on the display 205 concurrently with the current content 260 (e.g., a soccer match). The alert 265 may include a message such as, for example, "User B is watching this program. Would you like to change?" The alert 265 may also include one or more items 270, 275 that a user can select using the remote control to confirm or reject the previous command to change the content. For example, to confirm changing the content away from the current content 260, the user may use one or more cursor movement inputs (e.g., buttons) on the remote control 220 to highlight the item 270, and then select an 'ok' button on the remote control to select the item 270. In the event the user provides input to reject the content change (e.g., selects item 275), the display controller 210 controls the display 205 to remove the alert 265 and items 270, 275 and continue displaying the current content 260.

Alternatively, to reject changing the content away from the current content 260, the user may use one or more cursor movement inputs on the remote control 220 to highlight the item 275, and then select an 'ok' button on the remote control to select the item 275. In the event the user provides input to confirm the content change (e.g., selects item 270), then the display controller 210 controls the display 205 to remove the alert 265 and items 270, 275, discontinue displaying the current content 260, and begin displaying the new content (e.g., change the channel).

Figure 3B:
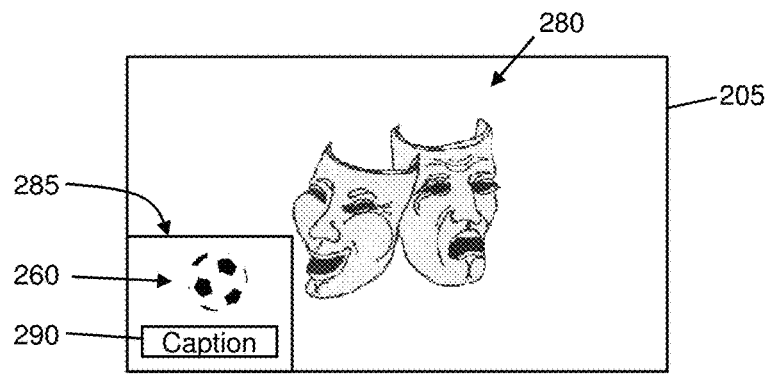
Figure 3C:
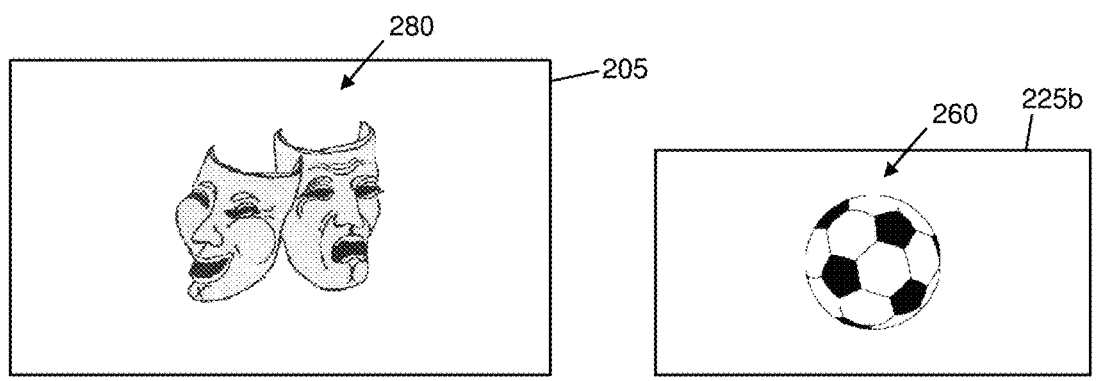

FIGS. 3B and 3C show alternatives for continuing show the current content 265 when a user confirms the intent to change to new content (e.g., when a user selects item 270 shown in FIG. 3A). In a first alternative shown in FIG. 3B, the new content 280 (e.g., a situation comedy) is shown in a main area of the display 205, and the current content 260 is shown in a sub-area 285 of the display 205, e.g., in a picture-in-picture mode. In this first alternative, the audio component (e.g., the sound) of the new content is output by the display 205 (or other audio system), and the audio content of the current content 260 is muted and transcribed to a text caption 290 that is shown with the current content 260 in the sub-area 285. In this manner, both users may continue watching their desire content on the same display 205.

In a second alternative shown in FIG. 3C, the new content 280 is shown on the display 205, and the current content 260 is shown in a display of the user device associated with the user whose attentive score for the current content exceeded the threshold value. In this example, user B (e.g., user 230*b*) has an attention score for the current content 260 that exceeds the threshold value. When another user (e.g., user 230*a*) provides input using the remote control 220 to change the content and confirms the change (e.g., by selecting item 270 in FIG. 3A), the display controller transmits the current content 260 to the user device 225*b* associated with the user 230*b* whose attention score for the first content 260 exceeded the threshold. For example, display controller 210 may transmit data defining the current content to the user device 225*b* via the local network 235. In this manner, the new content 285 is displayed on the display 205, and the current content is concurrently displayed on a separate device so that the interested user (e.g., user 230*b*) can continue watching the current content.

Figure 4:
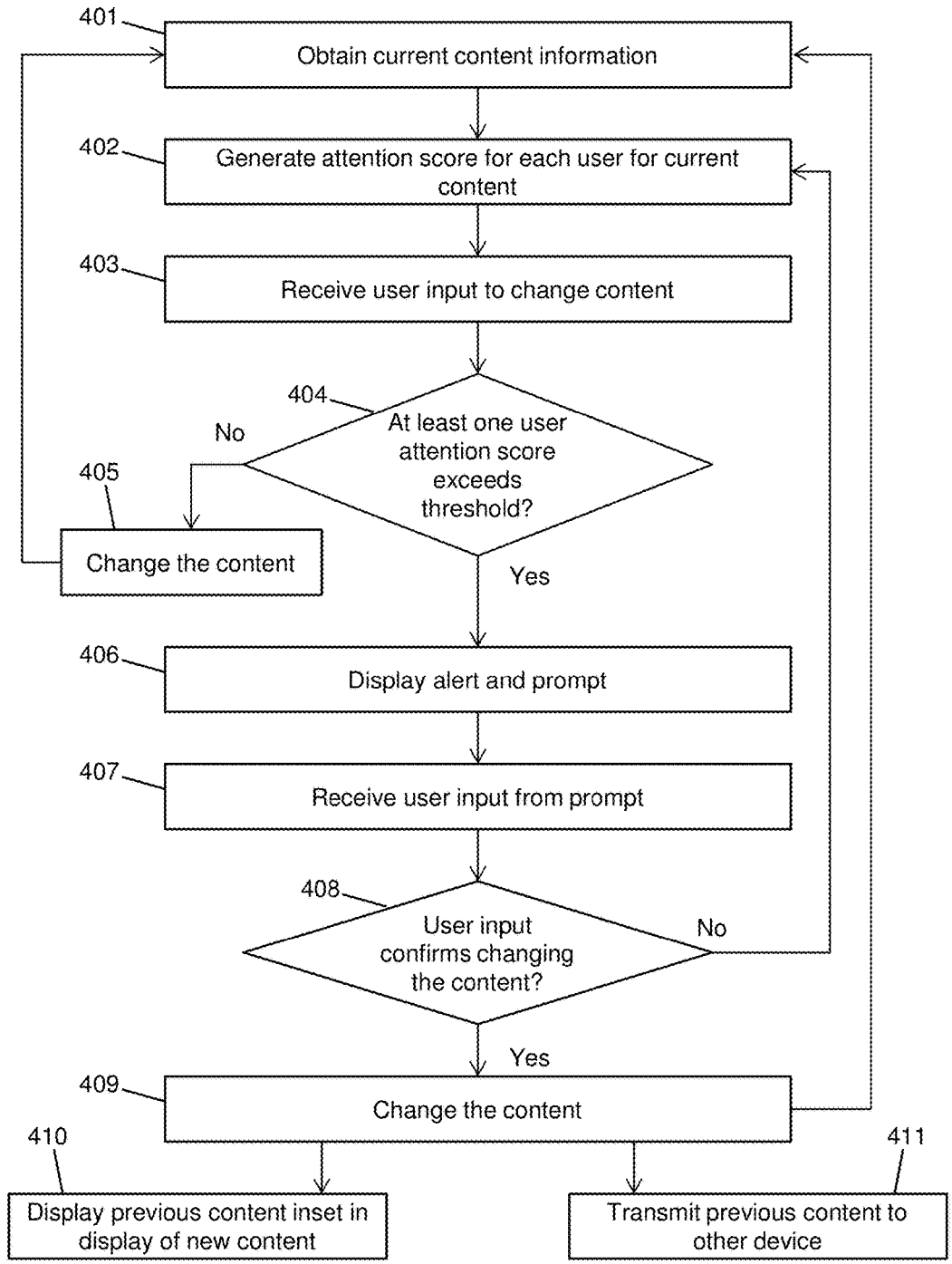
FIG. 4 shows a flowchart of a method in accordance with aspects of the invention.

FIG. 4 shows a flowchart of a method in accordance with aspects of the invention. The steps of the method may be performed in the system of FIG. 2 and are described with reference to the elements and steps described with respect to FIG. 2.

At step 401, the system (e.g., the display controller 210) obtains context information about the current content, e.g., the content being displayed on the display 205. In embodiments, the display controller 210 obtains the context information in the manner described with respect to FIG. 2, e.g., by at least one of: obtaining metadata associated with the current content, and performing video/audio contextual analysis of the current content.

At step 402, the system generates an attention score for each user 230*a-n* in the vicinity of the display 205. In embodiments, the display controller 210 generates (e.g., determines) an attention score for each user in the manner described with respect to FIG. 2, e.g., based on at least one of: data from the camera 215, data from a user device 225*a-n*, and data from one or more social media servers 245*a-m*. The attention score may be determined in any appropriate manner based on this data, and may be based on at least one of: whether a respective user is looking at the display 205, and for how long the user has been looking at the display 205 as determined from camera data; the user's facial expressions as determined from camera data; whether the user is performing other tasks concurrently while watching the display 205 as determined from camera data; whether the user has asked other users to keep quiet as determined from camera data; the user's interest in the current content as determined from the user's social media; the user's knowledge in the current content as determined from the user's social media; and the user's historical viewing pattern of the current content. As described with respect to FIG. 2, the attention score may be determined using any desired algorithm or numerical technique based on one or more of these factors. The attention score for each user 230*a-n* may be stored in a user profile. The attention score for each user 230*a-n* may be updated periodically, at any desired interval, by the system.

At step 403, the system receives a user input to change the content on the display 205 from the current content to a new content. In embodiments, step 403 involves one of the users 230*a-n* using the remote control to provide input to the display controller 210 to change the content (e.g., change the channel being shown on the display 205).

At step 404, based on receiving the input to change the content at step 403, the system compares each user attention score for the current content to a threshold value. Each attention score and the threshold value may be stored in the system (e.g., the display controller 210). As described with respect to FIG. 2, the threshold value can be any desired value, and may be a default value or a user-defined value that can be adjusted in a settings interface of the display controller 210.

In the event that none of the attention scores exceeds the threshold value at step 404, then at step 405 the system (e.g., the display controller 210) changes the content being displayed on the display 205, i.e., from the current content to the new content. The process then returns to step 401.

In the event that at least one of the attention scores exceeds the threshold value at step 404, then at step 406 the system (e.g., the display controller 210) displays an alert and a prompt on the display. As described with respect to FIG. 3A, the alert 265 and the prompt (e.g., items 270, 275) may be displayed on the display 205 concurrently with the current content 260.

At step 407, the system receives user input in response to the prompt from step 406. As described with respect to FIG. 3A, the user input may be received from the remote control 220, e.g., the user manipulating the remote control 220 to provide input to the display controller 210 to confirm or reject the content change.

At step 408, the system determines whether the user input from step 407 confirms or rejects the content change. In the event that the user input from step 407 rejects the content change, then the display controller 210 causes the display to continue showing the current content 260 and disregards the input for content change from step 403. The alert and prompt are removed from the display 205, and the process then returns to step 402 to continue updating each user's attention score for the current content.

In the event the user input from step 407 confirms the content change, then at step 409 the display controller 210 changes the content being displayed on the display 205 from the current content to the new content designated at step 403. The process returns to step 401.

Optionally, at step 410, the display controller 210 causes the display 205 to concurrently display the new content and the current content, e.g., as shown in FIG. 3B. Optionally, at step 411, the display controller 210 causes the display to display the new content and a user device to display the current content, e.g., as shown in FIG. 3C.

Figure 5:
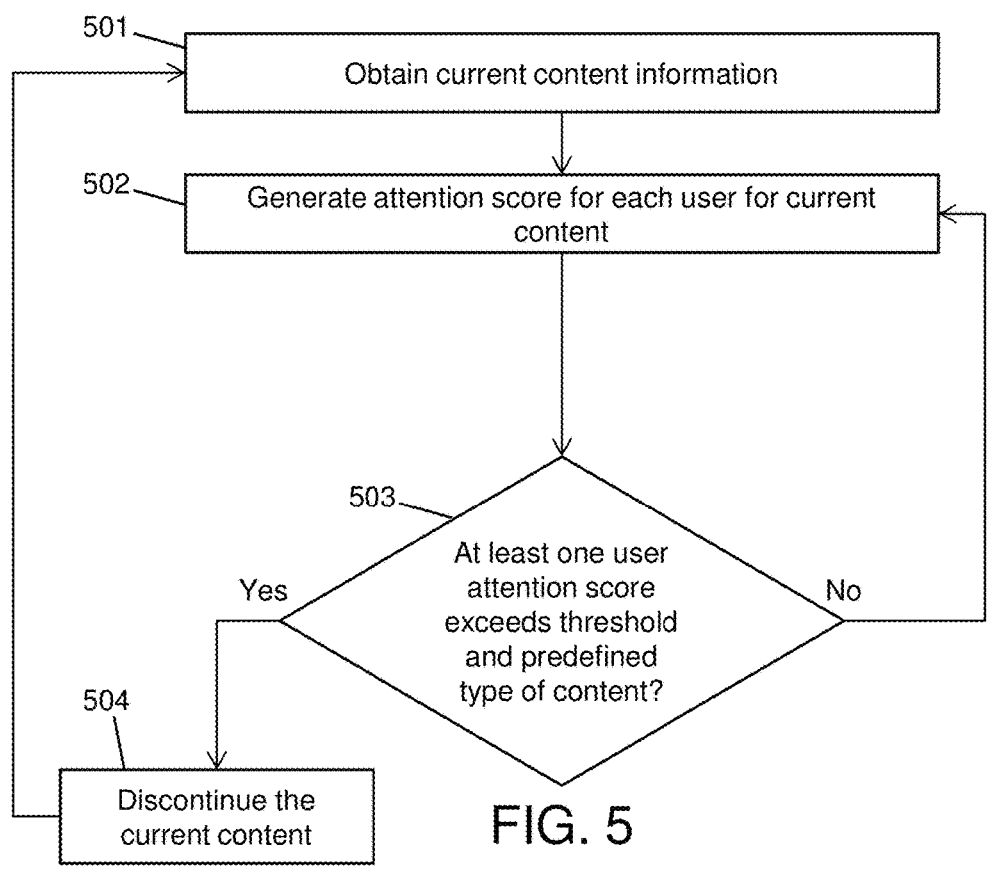
FIG. 5 shows a flowchart of a method in accordance with aspects of the invention.

FIG. 5 shows a flowchart of a method of automatically changing content in accordance with aspects of the invention. The steps of the method may be performed in the system of FIG. 2 and are described with reference to the elements and steps described with respect to FIG. 2. The method of FIG. 5 may be used to automatically change the current content when it is determined that a younger viewer's attention level exceeds a threshold level while a predefined type of content.

At step 501, the system (e.g., the display controller 210) obtains context information about the current content, e.g., the content being displayed on the display 205. Step 501 may be performed in the same manner as step 401. In this embodiment, the context information includes at least one of a rating (e.g. MPAA rating, etc.), topic, and genre.

At step 502, the system generates (e.g., determines) an attention score for each user 230a-n in the vicinity of the display 205. Step 502 may be performed in the same manner as step 402.

At step 503, the system determines whether at least one attention score exceeds a threshold value for a predefined type of content. In this embodiment, the predefined type of content may be at least one of: a predefined rating (e.g., PG-13 rated, etc.), a predefined topic, and a predefined genre (e.g., horror movie). The predefined type of content may be stored in the display controller 210, and may include default values or may be user-defined, e.g., via a settings interface of the display controller 210.

In the event that both conditions are not satisfied (i.e., the current content is not a predefined type of content and/or an attention score does not exceed the threshold value), then the display controller 210 causes the display 205 to continue displaying the current content. On the other hand, in the event that the current content is a predefined type of content and an attention score exceeds the threshold value, then at step 504 the display controller 210 automatically discontinues showing the current content on the display 205. For example, the display controller 210 may automatically change the content being shown on the display 205. In one example, the display controller 210 changes from the current content to a new content, e.g., changes the channel to a different channel that is predefined by a user (e.g., a parent) via a settings interface of the display controller 210. In another example, the display controller 210 turns off the display 205 so that no content is shown on the display 205.

In this manner, the method of FIG. 5 may be used to implement a parental control system for a younger viewer. The parent may define the predefined types of content and the threshold value in a setting interface of the display controller. In this manner, the parent may define parameters on what type of content the younger viewer may watch, and configure the system to automatically change the content when two criteria are satisfied: the content matches a predefined type, and the younger viewer's attention score exceeds the threshold value.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   obtaining, by a computer device, context information of current content being displayed on a display device by performing contextual video and/or audio analysis to detect, in the current content, at least one selected from a group consisting of: topic; genre; and actor;
   generating, by the computer device, a respective attention score for each one of plural users for the current content, wherein the respective attention score for each of the users is based on a determination of interest, knowledge and likes of the respective user for the current content based upon a comparison of the context information of the current content to social media content of the respective user;
   receiving, by the computer device, input to change from the current content to new content to display on the display device;
   determining, by the computer device and based on the receiving, that the attention score of at least one of the plural users exceeds a threshold value; and
   controlling the display device, by the computer device and based on the determining, to display an alert and a prompt to confirm or reject changing to the new content.

2. The method of claim 1, wherein the alert and the prompt are displayed concurrently with the current content.

3. The method of claim 1, wherein the prompt includes: a first user-selectable item to confirm changing to the new content; and a second user-selectable item to confirm changing to the new content.

4. The method of claim 1, wherein the alert identifies the at least one of the plural users whose attention score exceeds the threshold value.

5. The method of claim 1, wherein:
   the display device is a television; and
   the input to change from the current content to the new content is received from a remote control of the television.

6. The method of claim 5, wherein the current content is a first television show and the new content is a second television show different than the first television show.

7. The method of claim 1, wherein the attention score is also determined based on camera data.

8. The method of claim 1, wherein the attention score of a respective user of the plural users is determined based on at least one selected from the group consisting of:
   a determination of whether the respective user is looking at the display device;
   a determination of how long the respective user has been looking at the display device;
   a determination of facial expression of the respective user;
   a determination of whether the respective user is performing other tasks concurrently while watching the display device;
   a determination of whether the respective user has asked other users to keep quiet while watching the display device; and
   a determination of the respective user's historical viewing pattern of the current content.

9. The method of claim 1, further comprising:
   receiving user input to reject changing to the new content;
   controlling the display device to discontinue showing the alert and the prompt; and
   controlling the display device to continuing to display the current content.

10. The method of claim 1, further comprising:
    receiving user input to confirm changing to the new content;
    controlling the display device to discontinue showing the alert and the prompt; and
    controlling the display device to display the new content.

11. The method of claim 10, wherein the display device displays the new content in a first area, and further comprising controlling the display device to display the current content second area concurrently with displaying the new content in the first area.

12. The method of claim 11, further comprising:
    muting an audio component of the current content;
    transcribing the audio component to text; and
    displaying the text as a caption in the second area with the current content.

13. The method of claim 10, further comprising transmitting data for displaying the current content to a user device of the at least one of the plural users whose attention score exceeds the threshold value.

14. A computer program product comprising a computer readable storage medium having program instructions embodied therewith, the program instructions executable by a computer device to cause the computing device to:
    obtain context information of current content being displayed on a display device by performing contextual video and/or audio analysis to detect, in the current content, at least one selected from a group consisting of: topic; genre; and actor;
    generate a respective attention score for each one of plural users for the current content, wherein the respective attention score for each of the users is based on a determination of interest, knowledge and likes of the respective user for the current content based upon a comparison of the context information of the current content to social media content of the respective user;
    receive input to change from the current content to new content to display on the display device;
    compare, based on the receiving, the attention score of each one of plural users to a threshold value; and
    control the display device, based on the comparing, to perform one of: display the new content when the attention score of none of the plural users exceeds the threshold value without providing an alert and prompt to any of the plural users; and continue displaying the current content and display an alert and a prompt when the attention score of at least one of the plural users exceeds the threshold value.

15. The computer program product of claim 14, wherein the attention score of a respective user of the plural users is determined based on camera data and social media data.

16. The computer program product of claim 15, wherein the attention score of the respective user of the plural users is determined based on at least one selected from the group consisting of:
    a determination of whether the respective user is looking at the display device;
    a determination of how long the respective user has been looking at the display device;
    a determination of facial expression of the respective user;
    a determination of whether the respective user is performing other tasks concurrently while watching the display device;
    a determination of whether the respective user has asked other users to keep quiet while watching the display device; and
    a determination of the respective user's historical viewing pattern of the current content.

17. The computer program product of claim 14, wherein the comparing results in determining that the attention score of at least one of the plural users exceeds the threshold value, and the program instructions cause the computing device to:
- receive input confirming changing to the new content;
- control the display device to discontinue showing the alert and the prompt; and
- control the display device to display the new content in a first area and to display the current content second area concurrently with displaying the new content in the first area.

18. The computer program product of claim 14, wherein the comparing results in determining that the attention score of at least one of the plural users exceeds the threshold value, and the program instructions cause the computing device to:
- receive input confirming changing to the new content;
- control the display device to discontinue showing the alert and the prompt; and
- control the display device to display the new content; and
- transmit data for displaying the current content to a user device of the at least one of the plural users whose attention score exceeds the threshold value.

19. A system, comprising:
- a CPU, a computer readable memory, and a computer readable storage medium associated with a computer device;
- program instructions to obtain context information of current content being displayed on a display device by performing contextual video and/or audio analysis to detect, in the current content, at least one selected from a group consisting of: topic; genre; and actor;
- program instructions to generate a respective attention score for each one of plural users for the current content, wherein the respective attention score for each of the users is based on a determination of interest, knowledge and likes of the respective user for the current content based upon a comparison of the context information of the current content to social media content of the respective user;
- program instructions to receive input to change from the current content to new content to display on the display device;
- program instructions to determine, based on the receiving, that the attention score of at least one of the plural users exceeds a threshold value; and
- program instructions to control the display device, based on the determining, to display an alert and a prompt to confirm or reject changing to the new content,
- wherein the program instructions are stored on the computer readable storage medium for execution by the CPU via the computer readable memory.

20. The system of claim 19, wherein the attention score of a respective user of the plural users is determined based on at least one selected from the group consisting of:
- a determination of whether the respective user is looking at the display device;
- a determination of how long the respective user has been looking at the display device;
- a determination of facial expression of the respective user;
- a determination of whether the respective user is performing other tasks concurrently while watching the display device;
- a determination of whether the respective user has asked other users to keep quiet while watching the display device; and
- a determination of the respective user's historical viewing pattern of the current content.

* * * * *